US00RE35860E

United States Patent [19]

Ward

[11] E Patent Number: Re. 35,860

[45] Reissued Date of Patent: Jul. 28, 1998

[54] CORROSION-RESISTANT ZINC-NICKEL PLATED BEARING RACES

[75] Inventor: Peter C. Ward, Peterborough, N.H.

[73] Assignee: MPB Corporation, Keene, N.H.

[21] Appl. No.: 722,752

[22] Filed: Oct. 1, 1996

Related U.S. Patent Documents

Reissue of:

[64] Patent No.: 5,352,046
Issued: Oct. 4, 1994
Appl. No.: 923,371
Filed: Jul. 31, 1992

U.S. Applications:

[63] Continuation-in-part of Ser. No. 710,656, Jun. 5, 1991, abandoned.

[51] Int. Cl.[6] ..... F16C 33/62

[52] U.S. Cl. ..... 384/492; 384/625; 384/913

[58] Field of Search ..... 384/492, 625, 384/913, 491, 276, 912; 204/44.2

[56] References Cited

U.S. PATENT DOCUMENTS

| | | | |
|---|---|---|---|
| 1,755,686 | 4/1930 | DeJahn et al. | 384/625 |
| 3,212,834 | 10/1965 | Mayer et al. | 384/492 |
| 3,641,990 | 2/1972 | Kinnersly . | |
| 3,657,780 | 4/1972 | Stolte . | |
| 4,293,171 | 10/1981 | Kakumoto et al. . | |
| 4,309,064 | 1/1982 | Fukuoka et al. . | |
| 4,474,861 | 10/1984 | Ecer | 428/614 |
| 4,551,395 | 11/1985 | Lloyd | 428/677 |
| 4,621,700 | 11/1986 | Merkelbach | 180/70.1 |
| 4,641,976 | 2/1987 | Kar | 385/95 |
| 4,645,360 | 2/1987 | Eastwood et al. | 384/129 |
| 4,717,458 | 1/1988 | Martin et al. | 204/44.2 |
| 4,765,871 | 8/1988 | Hsu et al. | 204/44.2 |
| 4,818,632 | 4/1989 | Hsu et al. | 428/613 |
| 4,847,135 | 7/1989 | Braus et al. | 428/138 |
| 4,861,442 | 8/1989 | Nishihama | 204/44.2 |
| 4,908,280 | 3/1990 | Omura et al. . | |
| 4,946,747 | 8/1990 | Bergmann et al. | 428/653 |
| 4,972,764 | 11/1990 | Ohya et al. | 92/170.1 |

FOREIGN PATENT DOCUMENTS

| | | | |
|---|---|---|---|
| 0288677 | 2/1988 | European Pat. Off. . | |
| 247049 | 6/1987 | German Dem. Rep. | 384/492 |
| 1907897 | 10/1969 | Germany | 384/492 |
| 7918966 | 10/1980 | Germany . | |
| 3316678 | 11/1983 | Germany . | |
| 3414048 | 10/1985 | Germany . | |
| 3933896 | 10/1990 | Germany . | |
| 137621 | 8/1983 | Japan | 384/492 |
| 60-241516 | 11/1985 | Japan | 384/492 |
| 732268 | 6/1955 | United Kingdom . | |
| 2119814 | 11/1983 | United Kingdom . | |
| 2121120 | 12/1983 | United Kingdom . | |

OTHER PUBLICATIONS

Investigation of Nickel–Cadmium–Diffused and Cadmium Plating Replacement Coatings, C. Smith, 92APF–12, Allied– Signal Aerospace Company.

SAE Paper 920943, C. Smith, Apr. 20, 1992.

SAE Paper 830686, A New Zinc–Nickel Electroplating Process: Alternative to Cadmium Plating, G Hsu, 1983.

(List continued on next page.)

*Primary Examiner*—Thomas R. Hannon
*Attorney, Agent, or Firm*—Polster, Lieder, Woodruff & Lucchesi, L.C.

[57] ABSTRACT

A rolling element bearing includes a first ring having a first raceway; a second ring having a second raceway, and rolling elements between the two raceways. The first and second rings are positioned and configured so that the first and second raceways form a channel which retains the rolling elements. A first zinc alloy plated layer is on the first ring including at the first raceway, and a second zinc alloy plated layer is on the second ring including at the second raceway. The rolling elements may also be plated with a zinc alloy layer. The layers are porous and thus permit hydrogen to escape from the rings and rolling elements when baked, so that the rings and rolling elements possess low hydrogen embrittlement. The layers provide physical and galvanic protection to the underlying substrates for the rings.

23 Claims, 1 Drawing Sheet

OTHER PUBLICATIONS

Plating and Surface Finishing Zinc–Nickel Alloy Plating: An Alternative to Cadmium. G. Hsu. Apr. 1984.
SAE Paper 840815. Low Hydrogen Embrittlement Zinc–Nickel Electroplating: An Alternative to Cadmium–Update. G.Hsu 1985.
Oberflache+JOT. Helmut Enger. Zinc–Nicle. Alternative zur inormalen Verzinkung. 1989. publication 7. pp. 26 and 27.
SAE Technical Paper Series (841124). Extending Bearing Life in Off–Highway Equipment. International Off–Highway & Powerplant. Congress & Exposition. W. Waskiewicz. Sep. 1984.
SKF Umwertungstabells fur Vickersharte 1976.
SKF catalog 4000T. 1984. pp. 126.127.
Metal Finishing. Electrodeposition of Tungsten Alloys. M. Sarojamma. 1971.
Thyssen Edelstahl. Tec. Ber.. vol. 11. Pamphktz. Sep. 1985.
ATC Metalltechnologie. Amoloy Technology Coating. Sep. 1987.
Deutsche Norm. DIN 69051. Apr. 1989.
Deutsche Star. Das Linear–Programming. Jun. 1989.
Thomson Industries. Linear Motion Designer's Guide. Feb. 1984.
Technische Oberlfachen. Beuth Kommentare. 1981. pp. 32–35.
Metallwissenschaft+Technik. Electrodeposition Behavior of Ternary Zinc–Iron–Nickel Alloys. T. Akiyama. 1989.
Walzlager. Theorie and Praxis. M. Albert. 1987. p. 368.
Deutsche Star. Star Kugelrollen. 1987.
Das Techniker Handbuch. A. Boge. 1985. pp. 670.671.
Walzlager. Theorie and Praxis. M. Albert. 1987. pp. VII–X-VII. 19–22.
Smith. pp. 11 and 12 date & title unknown.

CORROSION-RESISTANT ZINC-NICKEL PLATED BEARING RACES

Matter enclosed in heavy brackets [ ] appears in the original patent but forms no part of this reissue specification; matter printed in italics indicates the additions made by reissue.

RELATED APPLICATION

This application is a continuation-in-part of application Ser. No. 07/710,656 filed Jun. 5, 1991.

BACKGROUND OF THE INVENTION

The invention relates to corrosion resistant rolling element bearings and a process for producing races for such bearings.

Some bearing applications require bearings which are capable of both enduring high loads and surviving in very corrosive environments. For example, so-called airframe bearings, such as, the bearings on which the control surfaces and flaps of aircraft oscillate, must survive exposure to moisture and deicing fluids, not to speak of salt spray on occasions. Moreover, these bearings experience wide variations in pressure which cause them to ingest fluids, bringing those fluids into contact with the raceways which deteriorates the raceways. Bearings for machinery used in the food processing industry likewise operate in hostile environments characterized by aqueous corrosion. The high strength material from which high load bearings are typically made (e.g., 52100 bearing steel) does not provide the required level of corrosion resistance for such environments.

In an effort to improve the corrosion resistance of such bearings, other base materials, such as 316 stainless steel, have been utilized. A problem with many such alternative base materials, however, is that they are not hardenable and thus are not capable of providing the required load handling capabilities of the high strength steels. Other stainless steels, such as 440C stainless, are hardenable, but do not have sufficient resistance to corrosion. Thus, insofar as the stainless steels are concerned, they are either corrosion resistant and incapable of acquiring suitable hardness or else capable of being hardened and incapable of resisting corrosion.

Another approach has been to deposit Thin Dense Chrome (TDC), that is, a very hard plating of chromium onto, the exposed areas including the wear or functional surfaces, such as the raceways along which the rolling elements roll. With TDC, however, it is very difficult to obtain sufficiently thick layers while still achieving the required level of consistency, that is, an absence of holes and surface flaws which provide focal points at which corrosive activity tends to occur. In this regard, chromium is noble to steel in most corrosive environments, and thus any break in the chromium coating will cause the steel to corrode at that break. Hence, the chromium must form a perfect physical barrier.

Yet another approach has been to deposit cadmium protective layers, which are soft in comparison to the hardened, high strength steel from which the bearing is constructed. Due to its softness and other characteristics, cadmium is not well suited for use on the functional surfaces. Under load conditions, the cadmium may separate from the steel base material and interfere with the operation of the bearing or otherwise is quickly worn off, thereby eliminating the physical and galvanic protection which it originally provided. As a consequence, in cadmium plated bearings, the cadmium does not exist along the functional surfaces, but instead the steel is exposed at these surfaces. Apart from that, the plating solution from which cadmium is derived also contains cyanide which is extremely toxic. Environmental regulations do not favor cadmium plating by reason of the toxicity of the plating solution.

Most processes for plating steel rely on electrochemical reactions within plating solutions that contain and indeed often liberate hydrogen. During the process the steel absorbs hydrogen, and the hydrogen embrittles the steel. But a measure of ductility, not brittleness, is desired in bearing races and the rolling elements which move along them. Cadmium deposits on steel in a somewhat porous condition, and one can relieve hydrogen embrittlement simply by baking the steel part after it is plated. During baking the hydrogen escapes through the pores in the coating. Some other metals deposit on steel in a generally impervious condition and in effect trap hydrogen in the steel so that it cannot be easily driven off by baking. Zinc and traditional zinc alloys have exhibited this characteristic when deposited by conventional electroplating processes.

SUMMARY OF THE INVENTION

In general, in one aspect, the invention features a rolling element bearing including a first race having a first raceway and a second race having a second raceway. The first and second races are positioned relative to each other so that the first and second raceways form a channel. The rolling element bearing also includes a first zinc alloy plated layer on the first raceway, a second zinc alloy plated layer on the second raceway, and a plurality of rolling elements disposed within the channel formed by the first and second raceways.

Preferred embodiments include the following features. The rolling element bearing also includes a lubricant (e.g. a grease) within the channel. The first and second zinc alloys are zinc-nickel alloys. The first race is an inner bearing ring and the second race is an outer bearing ring. Each of the rolling elements is a spherical bearing ball. The thickness of each of the first and second zinc alloy layers is between about 0.000050 and 0.000150 inch at the raceways and elsewhere is less than about 0.0010 inch, and preferably between about 0.0003 and 0.0005 inch. Each of the rolling elements may include a zinc alloy plated layer on its surface, with the thickness of the zinc alloy layer being between about 0.000025 and 0.0001 inch.

In general, in another aspect, the invention features a rolling element bearing including an inner ring having an outer raceway; an outer ring having an inner raceway, and the inner and outer rings being positioned so that the inner and outer raceways form a channel; a first zinc alloy plated layer on the inner raceway; a second zinc alloy plated layer on the outer raceway; a plurality of bearing balls disposed within the channel formed by the inner and outer races; and a lubricant within the channel.

Still another aspect includes the process of providing a substrate, applying a zinc alloy layer to the substrate by an electroplating process which leaves the layer with microscopic channels, and heating the substrate and layer to drive hydrogen from the substrate out through the pores in the zinc alloy layer.

One advantage of the invention is that it exhibits excellent galvanic corrosion protection on the high load, plated functional surfaces of rolling element bearings. Experiments have shown that even after 100 hours of exposure to salt spray in accordance with ASTM B117, the functional surfaces or the bearing rings which have been plated with zinc-nickel showed an absence of corrosion.

In addition, the zinc-nickel plating is somewhat porous in the sense that it contains microscopic fissures or channels which are interconnected between the steel-plating interface and the exposed face of the plating and allow hydrogen to escape from the steel when the plated steel is baked.

Moreover, even though the zinc-nickel plating is softer than the underlying high strength steel from which the bearing is made, it withstands the rolling contact under high load conditions (e.g. in excess of 150,000 p.s.i.). In addition, it does not degrade the underlying base material and thereby limit the load carrying capabilities of the bearing.

Other advantages and features will become apparent from the following description of the preferred embodiment and from the claims.

DESCRIPTION OF THE PREFERRED EMBODIMENT

STRUCTURE AND OPERATION

Figure 1:
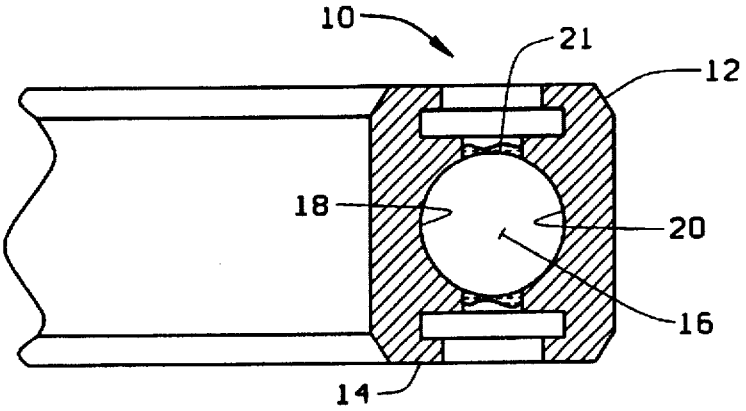
FIG. 1 is a cross-sectional view of a portion of a bearing assembly having inner and outer rings and balls between them, all made in accordance with and embodying the present invention.

FIG. 1 shows a bearing assembly 10 which will be used to illustrate the invention. Bearing assembly 10 includes an outer race or ring 12, an inner race or ring 14 and a set of rolling elements or bearing balls 16 (only one of which is shown) arranged in a single row between the two rings 12 and 14. An outer raceway 20 is formed around the inside circumference of outer ring 12 and an inner raceway 18 is formed around the outside circumference of inner ring 14. When inner ring 14 is assembled into outer ring 12, the outer and inner raceways 20 and 18 are aligned with respect to each other so as to form a channel which holds the set of bearing balls 16. Thus, inner ring 14 is free to rotate with respect to the outer ring 12 or vice versa about a common axis which is perpendicular to the planes of both rings 12 and 14. The channel also contains a lubricant 21. That lubricant may be a grease, such as Mobil 28 grease sold by Mobil Oil Corporation, or a liquid lubricant, such as oil, or even a solid lubricant, such as graphite.

Figure 2:
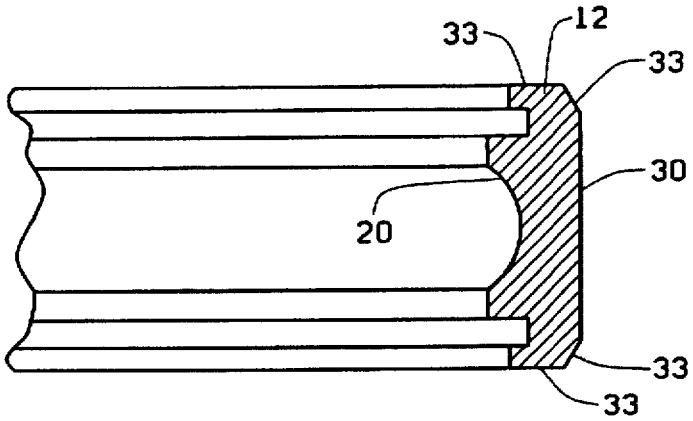
FIG. 2 is a cross-sectional view of a portion of the outer ring.
Figure 2A:
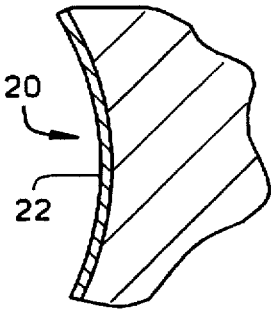
FIG. 2A is a fragmentary expanded view, in section, of the outer ring illustrated in FIG. 2 and showing the zinc-nickel plated layer.
Figure 3:
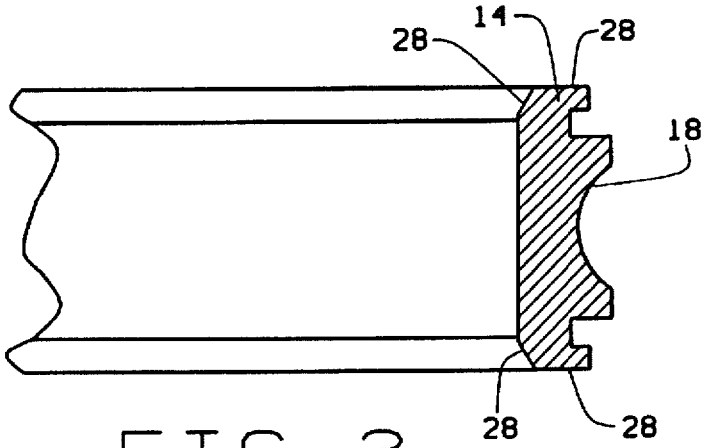
FIG. 3 is a cross-sectional view of a portion of the inner ring.
Figure 3A:
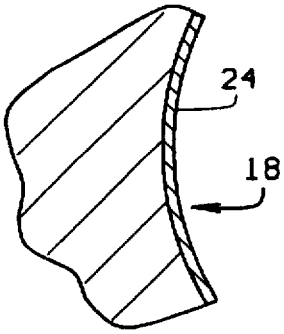
FIG. 3A is a fragmentary expanded view, in section, of the inner ring illustrated in FIG. 3 and showing the zinc-nickel plated layer.

As shown in greater detail in the exploded views in FIGS. 2A and 2B, a zinc-nickel plated layer 22 covers outer raceway 20 and a zinc-nickel plated layer 24 covers inner raceway 18. In the described embodiment, the thickness of the plated layers 22 and 24 within the raceways is between approximately 0.000050 and 0.000150 inch. Zinc-nickel plated layers 22 and 24 provide protection against corrosion which might tend to be caused by environmental conditions, e.g. the presence of salt water.

Zinc-nickel layers 22 and 24 are applied by an electrical plating process as described in U.S. Pat. No. 4,765,871 issued to G. Hsu et al. on Aug. 23, 1988, and U.S. Pat. No. 4,818,632 issued to G. Hsu et al on Apr. 4, 1989, both of which are incorporated herein by reference. Further information concerning the plating process and the zinc-nickel plating derived from it appears in SAE Paper 830686 entitled "A New Zinc-Nickel Electroplating Process Alternative to Cadmium Plating", Grace F. Hsu, reprinted from Proceedings of the 19th Annual Airline Plating & Metal Finishing Forum, page 127, which paper is also incorporated herein by reference. In the described embodiment, zinc-nickel is electroplated onto the entire outer ring 12 and the entire inner ring 14, including the raceways 20 and 18 of those rings. During the plating process, however, inner ring 14 is oriented within the electroplating bath relative to the zinc and nickel anodes so as to control the thickness of the plating which is formed on the outboard faces 28 of inner ring 14 to be within the range of 0.0003 to 0.0005 inch. The thickness of the plating on the raceway 18 of inner ring 14 is typically less than the controlled thickness, it being within the range of 0.000050 to 0.000150 inch in this region. Similarly with outer ring 12, during the plating process, it is oriented within the electroplating bath relative to the zinc and nickel anodes so as to control the thickness of the plating which is formed on the outside surface 30 and outboard faces 33 of outer ring 12 to also be within the range of 0.0003 to 0.0005 inch. As with inner ring 14 the thickness of the plating on the raceway 20 of the outer ring 12 is also typically less than this controlled thickness, it likewise being between about 0.000050 and 0.000150 inch.

The plating process yields zinc-nickel layers 22 and 24 which are porous in the sense that they contain microscopic escape channels. These channels extend completely through the layers 22 and 24 from their interfaces with the steel to the exposed exterior surfaces. The channels, which are described more fully in U.S. Pat. No. 4,818,632 and SAE Paper 830686, impart a porosity to the layers 22 and 24, and this porosity enables hydrogen, which is absorbed by the steel during the plating process, to escape when the rings 12 and 14 are heated to about 350° F. and held at that temperature for about 3.5 hours. Yet the escape channels in the layers 22 and 24 are small enough to prevent significant amounts of hydrogen from reaching the steel substrate of the rings 12 and 14 and reembrittling the steel when the bearing assembly 10 containing the rings 12 and 14 is placed in operation.

The zinc-nickel plated layers 22 and 24 exhibit a hardness that is in the range of about Rockwell C30 to C45, based on a conversion from a microhardness technique of testing, which is significantly softer than the underlying hardened, high strength steel and significantly softer than the thin dense chrome layers which have been used to achieve corrosion resistance on the functional surfaces of high load bearings.

Experiments have indicated that the zinc-nickel plating on raceways 18 and 20 survive 120,000 cycles of 90° rotation under 400 lbs radial load, which is 20% of the maximum rated load. This is about 2.5 times the normal design life.

Both outer ring 12 and inner ring 14 may be made of metal capable of withstanding stress levels of greater than 150,000 p.s.i., including for example, thru-hardened, high strength steel (e.g., 52100 bearing steel heat treated to Rockwell C60 or higher) or case-hardened steel with its hardened region being no less than 0.025 inches thick. In the described embodiment, rings 12 and 14 are fabricated from annealed steel in a conventional manner. The rough stock is heat treated, tempered one or more times to improve the toughness of the steel, and then precision ground on surfaces. As an optional step, the precision ground rings may be baked for 3.5 hours at a temperature of 350° F. prior to the plating process. After the optional pre-plating bake, a zinc-nickel layer is electroplated onto rings 12 and 14, including the functional surfaces, that is, the raceways 18 and 20. To perform the plating, rings 12 and 14 are rack mounted in the plating bath. They are suspended on the racks in such a way as to not obstruct plating onto the functional surfaces.

After the plating process is complete, the rings are again baked for 3.5 hours at 350° F. to avoid hydrogen embrittlement of the base metal or substrate. In effect, the baking drives from the steel rings 12 and 14 hydrogen which they acquired during the electrochemical plating. The hydrogen passes through the escape channels in the plated layers 22 and 24 and thus is not trapped in the rings 12 and 14 by the layers 22 and 24. This post-plating bake should be done within four hours of when the plating process is completed.

To extend the life of the bearings, it may also be desirable to administer a chromate treatment to the surface of the zinc-nickel layers followed by another bake out. The chromate treatment prevents "white rust" from forming on the zinc-nickel surface and postpones degradation of the zinc-nickel layers.

Other embodiments are within the following claims. For example, the invention has applicability to the general category of rolling element bearings, which includes among others, bearings which use tapered rollers and those which use cylindrical rollers. In addition, any one of a broad range of zinc alloy plated deposits may be used to provide similar corrosion resistance on the functional surfaces. Other appropriate zinc alloys include zinc-tin, zinc-cobalt and zinc-iron, to name a few.

Also, it may be desirable to plate the rolling elements or balls 16 as well as the races or rings 12 and 14. The plating process is essentially the same, but may utilize a conventional barrel plating arrangement rather than the rack mount arrangement used for plating the rings 12 and 14. Due to the micro sliding which the balls 16 experience, it may be desirable to keep the thickness of the plated layer on each ball 16 to within the range of 0.000025 to 0.0001 inch.

In the operation of the bearing assembly 10, the outer ring 12 will rotate around the inner ring 14 or the inner ring 14 will rotate within the outer ring 12. In either event, the balls 16 roll within the channel formed by the raceways 18 and 20 on the inner, ring 14 and outer ring 12, respectively. In other words, the balls 16 roll along the raceways 18 and 20, that is to say along the layers 22 and 24 of alloy plating that exist along the raceways 20 and 18. While the layers 24 and 22 in the regions of the raceways 18 and 20 possess the microscopic channels before the bearing assembly 10 is placed in service, thus permitting removal of hydrogen from the underlying steel of the rings 12 and 14, the balls 10 tend to obliterate the channels during operation. In the presence of the balls 16, the plated layers 22 and 24 undergo plastic deformation which tends to close the microscopic channels. But this does not matter, since the channels have already served their purpose. Indeed, the obliteration may even be desirable for it provides smoother surfaces along the raceways 18 and 20 and produces a further impediment to hydrogen embrittlement from the atmosphere and to fluids encountered in operation. Actually the layers 22 and 24 under a microscope appear somewhat nodular everywhere, except at the raceways 20 and 18 where they appear somewhat scuffed or smeared.

The layers 22 and 24 do not separate easily from the steel of the rings 12 and 14, and if they do experience any disintegration, it is usually in the form of small particles. Being primarily zinc, the particles are quite malleable and hence will not damage the rings 12 and 14 or the balls 16.

To be sure, the bearing assembly 10 includes seals which close the annular spaces between the outer and inner rings 12 and 14 at the ends of the assembly 10. The seals may be fitted to the inner ring 14 and have elastomeric lips which bear against the outer ring 12, thereby establishing dynamic fluid barriers along the outer ring 12. But the seals may leak, particularly if the bearing assembly 10 is subjected to wide variances in atmospheric pressure, as are airframe bearings. A drop in pressure will draw contaminants into the channel formed by the raceways 18 and 20, whereas a rise in pressure will purge grease from the channel. The layers 22 and 24, being over the steel at the raceways 20 and 18, prevent the contaminants from actually contacting the steel and thus establishes a physical barrier along the raceways 20 and 22. Zinc, being higher than iron in the electromotive-force series for practically all corrosive environments further enables the plated layers 22 and 24 to provide galvanic protection for the steel of the rings 12 and 14.

Beyond the region enclosed by the seals, the surfaces 30 and 33 of the outer ring 12 and the faces 28 of the inner ring 14 are exposed, and the rings 12 and 14 would quickly corrode in these areas were it not for the plated layers 22 and 24 which exist along them. The layers 22 and 24 in these regions prevent the steel of the rings 12 and 14 from coming into contact with the atmosphere and any fluids to which the bearing assembly 10 may be subjected, such as deicing solution, salt spray, or simply water. Even if the physical barrier formed by the layers 22 and 24 is disrupted by reason of being damaged, the underlying steel of the rings 12 and 14 will not corrode owing to the galvanic protection provided by the zinc of the layers. Likewise, the presence of the fissures or microscopic channels in the layers 22 and 24 does not result in any corrosion of the underlying steel in the rings 12 and 14. Thus, the layers 22 and 24 provide a high level of physical and galvanic protection for the steel substrates of the rings 12 and 14.

What is claimed is:

1. A rolling element bearing comprising:

a first race having a first raceway;

a second race having a second raceway, said first and second races being positioned so that said first and second raceways form a channel;

a first zinc alloy plated layer on said first race along the first raceway thereof;

a second zinc alloy plated layer on said second race along the second raceway thereof; and a plurality of rolling elements disposed within said channel formed by said first and second raceways.

2. The rolling element bearing of claim 1 further comprising a lubricant within said channel.

3. The rolling element bearing of claim 2 wherein said lubricant is a grease.

4. The rolling element bearing of claim 2 wherein said first race is an inner bearing ring and said second element is an outer bearing ring.

5. The rolling element bearing of claim 4 wherein each of said rolling elements is spherical.

6. The rolling element bearing of claim 1 wherein zinc alloy of the plated layers is porous and the first and second races have low hydrogen embrittlement by reason of hydrogen formerly contained within the races having escaped through the pores in the layers of those races.

7. The rolling element bearing of claim 1 wherein said first and second zinc alloys are zinc-nickel alloys.

8. The rolling element bearing of claim 1 wherein the thickness of each of the first and second zinc alloy layers is less than about 0.0010 inch.

9. The rolling element bearing of claim 8 wherein the thickness of each of the first and second zinc alloy layers is between about 0.0003 and 0.0005 inches remote from the raceways.

10. The rolling element bearing of claim 1 wherein each of said plurality of rolling elements includes a zinc alloy plated layer on its surface.

11. The rolling element bearing of claim 10 wherein the zinc alloy plated layer on each of said plurality of rolling elements is less than about 0.0001 inch.

12. An antifriction bearing comprising:

a first race having a raceway;

a second race having a raceway that is presented toward the raceway of the first race;

at least one of the races including a substrate and zinc alloy over the substrate in the form of a plating, the zinc alloy plating being at the raceway of the first race and elsewhere on the first race as well, the zinc alloy plating having microscopic pores which extend through it from the substrate to its exposed surface;

and rolling elements located between the races at the raceways thereof.

13. A bearing according to claim 12 wherein substrate of said one race is steel having low hydrogen embrittlement by reason of having been heated to the extent that hydrogen formerly contained within it has been driven off through the pores in the zinc alloy layer.

14. A bearing according to claim 12 wherein each race has a substrate of steel and a zinc alloy plating over the substrate, and the steel substrate has low hydrogen embrittlement.

15. A bearing according to claim 14 wherein the zinc alloy plating on each of the races is applied electrically and also includes nickel.

16. A bearing according to claim 15 wherein the zinc alloy plating on each of the races covers substantially the entire race.

17. A bearing according to claim 14 wherein each rolling element includes a steel substrate and a zinc alloy plating over the substrate.

18. A bearing according to claim 17 wherein the zinc alloy plating on the rolling elements includes nickel.

19. A bearing according to claim 12 wherein the zinc alloy plating of said one race covers substantially the entire race.

20. A bearing according to claim 12 wherein the zinc alloy layer also contains nickel.

*21. An antifriction bearing comprising:*

*a first race having a raceway;*

*a second race having a raceway that is presented toward the raceway of the first race;*

*at least one of the races including a substrate and zinc alloy over the substrate in the form of a plating, the zinc alloy plating being at least along the raceway of said one race; and*

*rolling elements located between the races at the raceways thereof.*

*22. A bearing according to claim 21 wherein the zinc alloy plating of said one race covers substantially the entire race.*

*23. A bearing according to claim 21 wherein the zinc alloy plating also contains nickel.*

* * * * *